US012095125B2

United States Patent
Holland

(10) Patent No.: US 12,095,125 B2
(45) Date of Patent: Sep. 17, 2024

(54) HEAT SINK FOR ELECTRICAL DEVICE

(71) Applicant: BAE SYSTEMS plc, London (GB)

(72) Inventor: Graham Andrew Holland, Preston (GB)

(73) Assignee: BAE SYSTEMS PLC, London (GB)

( * ) Notice: Subject to any disclaimer, the term of this patent is extended or adjusted under 35 U.S.C. 154(b) by 596 days.

(21) Appl. No.: 17/420,309

(22) PCT Filed: Jan. 14, 2020

(86) PCT No.: PCT/GB2020/050067
§ 371 (c)(1),
(2) Date: Jul. 1, 2021

(87) PCT Pub. No.: WO2020/148524
PCT Pub. Date: Jul. 23, 2020

(65) Prior Publication Data
US 2022/0093948 A1 Mar. 24, 2022

(30) Foreign Application Priority Data
Jan. 14, 2019 (GB) .................................... 1900461

(51) Int. Cl.
B64D 41/00 (2006.01)
B64D 7/02 (2006.01)
C01B 3/00 (2006.01)
F41H 13/00 (2006.01)
H01M 8/04029 (2016.01)
H01M 8/04082 (2016.01)
H01M 8/04186 (2016.01)

(52) U.S. Cl.
CPC .......... *H01M 8/04216* (2013.01); *B64D 7/02* (2013.01); *B64D 41/00* (2013.01); *C01B 3/0031* (2013.01); *F41H 13/005* (2013.01); *H01M 8/04029* (2013.01); *H01M 8/04186* (2013.01); *B64D 2041/005* (2013.01); *H01M 2250/20* (2013.01)

(58) Field of Classification Search
None
See application file for complete search history.

(56) References Cited

U.S. PATENT DOCUMENTS

| 2006/0078034 A1 | 4/2006 | Coffinberry |
| 2010/0074736 A1 | 3/2010 | Junod |
| 2011/0115227 A1 | 5/2011 | Shafer et al. |

(Continued)

FOREIGN PATENT DOCUMENTS

| JP | H06336934 A | 12/1994 |
| KR | 101628178 B1 | 6/2016 |

(Continued)

OTHER PUBLICATIONS

English translation of KR101628178B1 (Year: 2015).*

(Continued)

*Primary Examiner* — Lucas J. O'Donnell
(74) *Attorney, Agent, or Firm* — Finch & Maloney PLLC

(57) ABSTRACT

The present invention relates to an apparatus, detachably mountable to the external surface of an aircraft. More specifically, the present invention relates to a fully self-contained apparatus comprising an electrical device, such as a Directed Energy Weapon (DEW), and a corresponding thermal management system and power supply.

16 Claims, 4 Drawing Sheets

(56) References Cited

U.S. PATENT DOCUMENTS

| | | |
|---|---|---|
| 2012/0000205 A1 | 1/2012 | Coffinberry et al. |
| 2012/0160957 A1* | 6/2012 | Gagne .................. B64D 41/00 |
| | | 244/54 |
| 2012/0247117 A1 | 10/2012 | Gagne et al. |
| 2017/0074166 A1* | 3/2017 | Gagne .................. H02K 7/1823 |
| 2019/0190041 A1* | 6/2019 | Godula-Jopek ....... C01B 3/0078 |
| 2021/0057793 A1* | 2/2021 | Hendriksen ......... H01M 10/613 |

FOREIGN PATENT DOCUMENTS

| | | |
|---|---|---|
| WO | 2007096656 A1 | 8/2007 |
| WO | 2014152778 A1 | 9/2014 |
| WO | 2020148524 A1 | 7/2020 |

OTHER PUBLICATIONS

International Search Report and Written Opinion received for PCT Application No. PCT/GB2020/050067. Mail date: Apr. 28, 2020. 11 pages.

Search Report under Section 17(5) received for GB Application No. 1900461.3, dated Jun. 25, 2019. 4 pages.

International Preliminary Report on Patentability received for PCT Application No. PCT/GB2020/050067. Mail date: Jul. 29, 2021. 7 pages.

* cited by examiner

HEAT SINK FOR ELECTRICAL DEVICE

FIELD OF THE INVENTION

The present invention relates to heat sink system, more preferably a system detachably mountable to the external surface of an aircraft. More specifically, the present invention relates to a fully self-contained apparatus comprising an electrical device, such as a Directed Energy Weapon (DEW), and a thermal management system comprising a metal hydride store.

BACKGROUND

Electrical devices often produce excess heat in use, and require thermal management in order to maintain their optimal operational temperature levels. Operating such devices in temperatures above (or below) the optimal temperature range will negatively impact the reliability, operational lifespan and/or efficiency of the electrical device. Therefore thermal management systems are employed to maintain the optimal operational temperature of the electrical device to maximise reliability, operational lifespan and/or efficiency.

Thermal management systems are designed to regulate and/or control the temperature of operational devices. An example thermal management component is a heat exchanger, which is designed to transfer heat away from a heat source, e.g. from an operational electrical device. Thermal energy may be absorbed and expelled directly from the electrical device by a heat exchanger, or indirectly by using a fluid coolant to transfer thermal energy from the electrical device to a heat exchanger. Fluid coolants typically have a high thermal capacity and therefore can hold large amounts of thermal energy. An example of a heat exchanger is found in an internal combustion engine in which a fluid coolant flows through the heat source (the engine itself). The thermal energy is transferred to the fluid coolant, away from the engine, causing the fluid coolant to heat up, subsequently reducing the heat of the engine. The heated fluid coolant then passes through a series of radiator coils, and as air flows past the radiator coils the thermal energy is transferred from the fluid coolant, cooling it down, to the incoming air. The thermal energy is carried away by the heated air.

During operation of a high-powered electrical device, such as a Directed Energy Weapon (DEW), power must be provided not only to the electrical device, but to the corresponding thermal management system (e.g. fluid coolant pump) as well. Where electrical devices are installed or mounted on aircraft, both the fluid coolant and power supplies are typically sourced from the aircraft stores. However, transferring fluid coolant and/or power from the aircraft is troublesome, and aircraft supplies and resources are very carefully controlled in view of weight and space limitations. The present invention therefore seeks to provide an improved arrangement for adapting external electrical devices for use by aircraft.

STATEMENTS OF ADVANTAGE

According to a first aspect of the invention, there is provided a pod for a vehicle vessel or craft, comprising:
an electrical device;
a thermal management system for the electrical device, the thermal management system comprising a heat-activated release hydrogen storage tank; and
an auxiliary power unit (APU), fueled, at least in part, by the released hydrogen, such that said APU provides power to the electrical device.

The heat-activated release hydrogen storage tank, may be a physical store of the gas such as pressurised cylinder with a thermally actuated regulator, or a chemically stored forms such as, for example a metal hydride, non-metal hydride hydrogen storage system, organics (LOHC), cryogenic and liquefied storage.

Preferably the heat-activated release hydrogen storage tank may be a metal hydride hydrogen storage system. The use of a metal hydride storage tank typically involves the use of an external heater system to cause the release of the hydrogen gas. In the arrangement, the heat-activated release hydrogen storage tank is acting as a parasitic heat sink, and may not require a specific additional heating system to cause activation and release of the hydrogen gas.

In a preferred arrangement the metal hydride system acts as a heat sink, removing heat from the electrical device during its operation, which causes the concomitant release of the hydrogen from the metal hydride.

The thermal management system may further comprise a fluid coolant system, to provide further thermal control of the electrical device, The APU may then provide power to both the electrical device and the fluid coolant system which forms part of the thermal management system.

The APU may be further fueled by a liquid fuel, and so the pod may comprise a liquid fuel tank for powering, at least in part, the APU.

The hydrogen gas released from said heat-activated release hydrogen storage tank, may conveniently be used as a fuel to power the APU, which in turn may provide some, all or part of the electrical power and mechanical power. Alternatively the hydrogen that is released may be passed through a hydrogen fuel cell, such as for example a solid oxide fuel cell, PEM or alkaline fuel cell, to provide electrical energy. The electrical energy generated may be stored in a cell, capacitive storage or the electrical energy may be used directly, such as in the thermal management system or the said electrical device.

The metal hydride may be any metal or metallic hydride, such as for example AB, AB2 or AB5 type. Well known examples may be AB type: Ti—Fe—Ca, Ti—Fe—C, Ti—Fe, Ta, Ti—Fe-Mm. The AB2 type: Ti—Zr—Cr—Fe, Ti—Cr—Fe, Ti—Zr—Cr—Fe—Mn—Cu, Ti—Mn—V, Ti—Zr—Mn—V—Fe. The AB5 type: Ca-Mm-Ni—Al Mm-Ni—Mn—Co, (Mm-mischmetal alloy) or $LaNi_5$.

The metal hydride thermal store may be designed to store any volume of hydrogen gas, commercially available solutions provide anywhere from 20 litres to 5000 litres. The metal hydride thermal store may provide a heat sink effect for the cooling system; for example a 100 kW electrical device may be operated for up to a total of 100 seconds to cause the release of substantially all of the hydrogen gas in a 5000 litre metal hydride store.

The APU typically may also provide a high-pressure air supply to at least one of: the electrical device; the thermal management system; and the APU liquid fuel supply.

The APU may comprise a gas turbine generator or a hydrogen fuel cell. This provides a small and efficient power source to power both the electrical device and the temperature control system.

The pod may comprise a communication means between the vehicle, vessel or craft and the electrical device to allow control of the electrical device from the said vehicle, vessel or craft.

The pod may be an integral part of a vehicle vessel or craft or may be a detachable pod, such that is may be retrofitted to a vehicle vessel or craft, more preferably a detachable pod for an aircraft.

Preferably, the pod also comprises a liquid fuel tank to hold fuel to power the APU. The detachable pod may be fully self-contained, therefore does not need to draw from the limited aircraft fuel and power supplies. Furthermore, the detachable nature means the pod can be mounted/detached to existing standard mounts on the aircraft.

In one example, the APU also provides a high-pressure air supply. This high-pressure air supply can be utilised by the electrical device, the thermal management system, and/or the APU fuel supply, all without drawing from the vehicle vessel or craft supplies.

In another example, the APU comprises a generator and a gearbox. The generator may provide electrical power to the electrical device, and the gearbox may provide mechanical power to the thermal management system to pump fluid coolant to the electrical device.

In another example, the fluid coolant of the thermal management system may comprise a carrier fluid and encapsulated phase change material (PCM) particles suspended in the carrier fluid. This may provide enhanced heat transfer capabilities compared to a simple fluid coolant alone, since the latent heat storage of the PCM allows the fluid coolant to extract, store and transfer more thermal energy from a heat source. Preferably, the encapsulated PCM particles are constrained in the thermal management system by a porous membrane through which the fluid coolant flows. This prevents the PCM particles contaminating other parts of the system.

In another example, the electrical device is a laser Directed Energy Weapon (DEW).

In another example, the pod comprises a fuel feed from the vehicle vessel or craft fuel reservoir. This allows the detachable pod to utilise the host's fuel source if needed.

In another example, liquid fuel is used as the fluid coolant for the electrical device. This allows weight to be saved by combining the fuel and fluid coolant supplies.

In another example, the detachable pod may be detachably affixed to pylons on the aircraft wings. This means that the detachable pod can be easily installed and uninstalled without expensive re-fitting or adaption of the aircraft.

According to a further aspect of the invention there is provided the use of a heat-activated release metal hydride hydrogen storage tank as a heat sink for an electrical device, wherein said hydrogen released may be converted to electrical energy or mechanical energy, such as, for example to provide power to said electrical device.

FIGURES

The invention may be performed in various ways and specific embodiments will now be described, by way of example only, and with reference to the accompanying drawings, in which.

DETAILED DESCRIPTION

Figure 1:
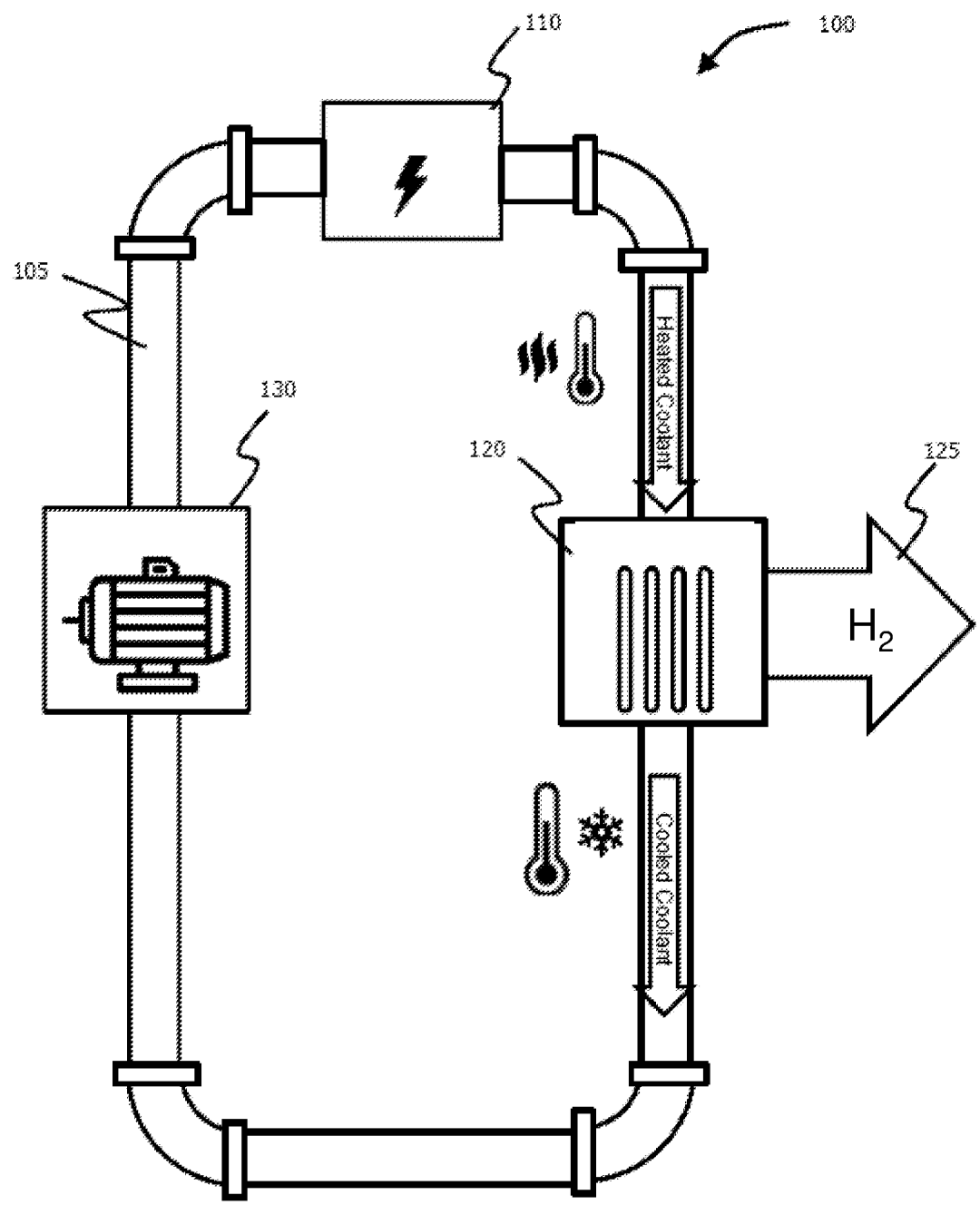
FIG. 1 is a schematic view of an example arrangement of a thermal management system.

FIG. 1 shows a schematic view of an example thermal management system 100. During operation, an electrical device 110, which generates excessive heat. Coolant, typically a fluid i.e. liquid or gas, is used to reduce or regulate the temperature of the system 100 and the electrical device 110. Ideally, the coolant used has high thermal capacity so as to be able to absorb and transfer large amounts of thermal energy from the electrical device 110. A common example of a coolant is water. Other examples include water-glycol and oil-based fluids. A coolant may maintain its state of matter (e.g. stay liquid or gas) during the cooling process, or the coolant can undergo a phase transition, i.e. changing from one state of matter to another, with latent heat adding to the cooling efficiency. Latent heat is thermal energy which allows a substance, e.g. the coolant, to change state without changing the temperature of the substance. In contrast to latent heat, "sensible heat" involves an energy transfer that results in a temperature change of the system, and is the most common form of heat storage. In an example where the coolant is water, transferring heat from a heat source may cause the initially liquid coolant to transition into a gas, i.e. steam.

During operation, coolant is transferred around the closed-loop system 100 along coolant pipes 105 by a pump 130. The coolant flows past or through the electrical device 110. The coolant extracts/absorbs thermal energy from the electrical device 110, cooling the electrical device 110, and subsequently the coolant carries the thermal energy away from the electrical device 110 to the heat-activated release hydrogen storage tank 120. The heat-activated release hydrogen storage tank 120 may conveniently be a metal hydride hydrogen storage tank, which extracts the thermal energy from the coolant, and the coolant exits the heat-activated release hydrogen storage tank 120 as cooled fluid, concomitantly the metal hydride store 120 is caused to heat up which causes release of the hydrogen gas 125. The gas may then be used to power other systems, or to generate electricity.

Figure 2:
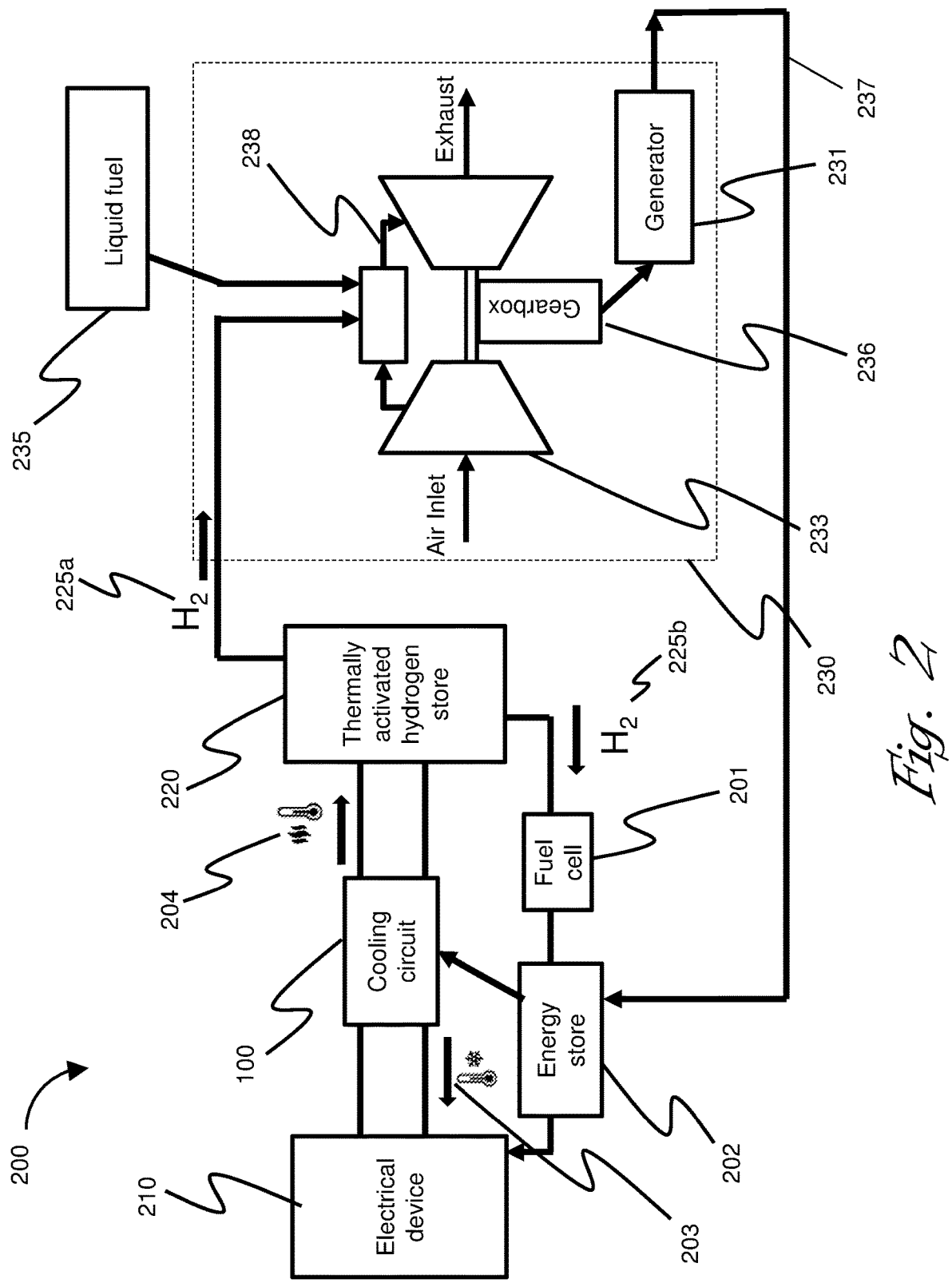
FIG. 2 is a schematic view of an example self-contained detachable pod attached to an aircraft.

Turning to FIG. 2, there is provided a thermally managed device 200, such as a directed energy device. The electrical device 210 may generate larger amounts of heat as a result of operation, such as for example RF, laser etc. The device 210 requires cooling via a cooling circuit 100, such as that exemplified in FIG. 1. The cooling circuit 100, takes heated coolant 204, and passes it across a thermally activated hydrogen store 220, The heat-activated release hydrogen storage tank 220 may conveniently be a metal hydride hydrogen storage tank, which extracts the thermal energy from the coolant. The coolant exits the heat-activated release hydrogen storage tank 120 as cooled fluid 203, concomitantly the metal hydride store 220 is caused to heat up which causes release of the hydrogen gas 225a, 225b. The hydrogen gas 225b may then be passed via a fuel cell 201, such as a solid oxide fuel cell, to generate an electrical voltage which may be captured in an energy store 202, such as for example a battery or capacitive store, The electrical energy in the store 202 may be used to power the electrical device 210 or the cooling circuit pumps. The hydrogen gas 225a, may be used in an APU 230, the APU may use the hydrogen 225a as a fuel in combination with air intake, to drive a turbine 238. The turbine may be operably linked to a gear box 236, which drives an electrical generator 231. The electrical generator 231 provides electrical power 237 which may be fed to the energy store 202. Conveniently the APU may provide power for the coolant circuit or fuel pumps etc. The turbine 238 may also be caused to be fueled by a liquid fuel 235.

Figure 3:
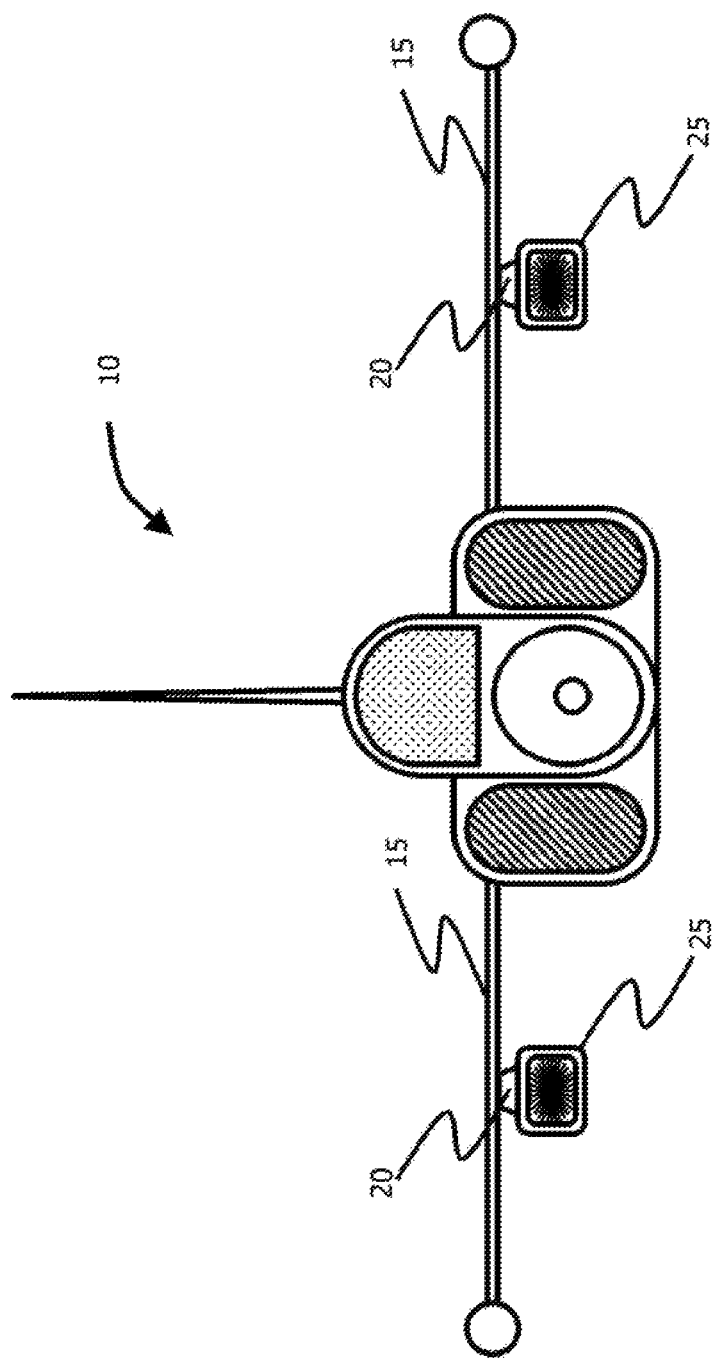
FIG. 3 is a schematic view of an example self-contained detachable pod attached to an aircraft wing.

FIG. 3 shows a front-on view of an example aircraft 10. In the example shown, two detachable pods 25 are mounted to the underside of the aircraft wings 15 by pylons 20 at corresponding "hardpoints" on the aircraft 10. A hardpoint is a specified location (or "station") on an aircraft frame, such as the wings or fuselage, designed to have an external or internal load mounted to it. In civilian aviation a station may be used to carry an external engine or a fuel tank. In military applications, the stations may be used to carry additional weapons or other payloads. Externally mounted detachable pods may be jettisoned from the aircraft in order to save weight and/or increase manoeuvrability, either in an emergency or after the contents have expired. When an item is mounted or carried on the hardpoints or stations of an aircraft wing 15, pylons 20 may be used. Pylons 20 are adaptors connecting the wing frame of the aircraft to the item or object that is being carried, and clear the carriage item from the control surfaces on the wing 15, as well as prevent undesired disturbance of the flow of air toward the wing 15.

In order to allow a range of external aircraft stores (i.e. items or devices for carriage) to be mounted on various different types of aircraft 10, pylons 20 may be modular, wherein they are compatible with numerous stores or payloads, thus allowing efficient mounting/unmounting of different stores on different aircraft. Detachably mountable pods 25 can be easily/quickly installed by ground crew, thus reducing or eliminating the need for costly, complicated and/or time-consuming aircraft integration works to be carried out. Whilst the example shown is FIG. 3 has two detachable pods 25 mounted under the wings (one under each wing), in other examples a detachable pod 25 may be mounted to a different portion of the aircraft 10, for example, to the underside of the fuselage. It is desirable that the detachable pod 25 is aerodynamic, providing as little air-resistance as possible to the aircraft 10 during flight. In one example, the detachable pod 25 is conformal, i.e. faired smoothly into or onto the fuselage of the aircraft 10.

Figure 4:
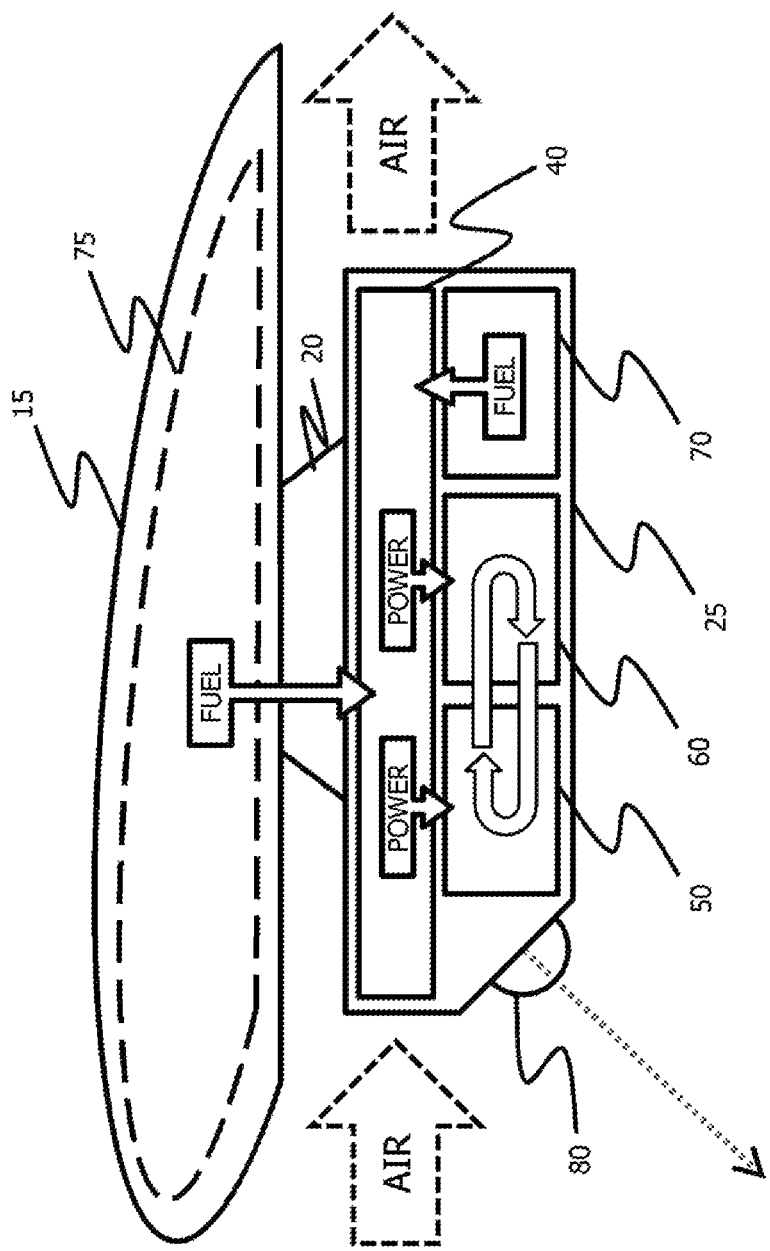

FIG. 4 is a side-on schematic view of the aircraft wing 15 of the example aircraft 10 shown in FIG. 3. A detachable pod 25 is suspended beneath a pylon 20, wherein the pylon 20 is connected to the underside of the wing 15.

In the example shown, the detachable pod 25 comprises an electrical device 50, a thermal management system 60 for the electrical device, and an auxiliary power unit (APU) 40 for both the electrical device 50 and the thermal management system 60. The thermal management system 60 comprises a fluid coolant, which is pumped around the thermal management system 60 and electrical device 50.

In one example, the APU 40 is a gas turbine generator. During operation, air enters the gas turbine through a compressor (not shown), wherein the compressor increases the pressure of the air. Fuel, which may be hydrogen or a liquid fuel is injected into the compressed air, and ignited, generating a high-temperature gas. The hot gas enters a turbine (not shown), and as the gas expands, it imparts rotational energy to the turbine and the exhaust (expanded gas) is expelled. The rotation of the turbine shaft drives the compressor, drawing in and compressing more air to sustain continuous combustion. The remaining (rotational) shaft power may be used to drive a generator (not shown), which produces electricity. The generated electrical power may be used to power the electrical device 50 or stored in an energy store for later use. High-load electrical devices such as DEWs require a lot of electrical energy. By providing a dedicated power source, the aircraft energy supplies are not depleted and/or affected by the draw from the DEW. In addition to providing electrical power by transferring rotational energy to the generator, the APU 40 may further comprise a gearbox (not shown) in order to provide mechanical power driven by the shaft rotation. This mechanical power can be used, for example, to power a pump in the thermal management system 60. Alternatively, the pump may draw electrical power from the generator.

In another example, the detachable pod 25 may incorporate a ram air turbine (RAT). During operation, air enters the RAT, and the passing air imparts rotational energy to a turbine. The rotational shaft power may be used to drive a generator, which produces electricity, or provide mechanical power via a gearbox. A RAT utilises the forward motion of the aircraft 10 through the air to operate, and only generates power (either electrical or mechanical) whilst the aircraft 10 is moving through the air. Whilst the RAT generates power independently of the aircraft, the additional draft/friction caused by the RAT will result in greater fuel consumption by the aircraft.

In one example, the APU 40 not only provides electrical and mechanical power to the internal systems within the detachable pod 25 (e.g. the electrical device 50 and thermal management system 60), but may also provide a high-pressure air supply. This high-pressure air supply may be used to pump fuel to the APU 40, and/or fluid coolant around the thermal management system 60 and electrical device 50.

In one example (where the APU 40 comprises a gas turbine generator), the detachable pod 25 also comprises an internal fuel tank 70 in order to provide fuel to the APU 40. In other examples, fuel may be alternatively (or additionally) supplied to the APU 40 from the aircraft 10 fuel stores. In one example, the aircraft 10 utilises a "wet-wing" configuration, wherein a sealed reservoir 75 in the wing 15 frame is used as a fuel tank. Fuel may be provided to the APU 40 from either the internal fuel reservoir 70 of the detachable pod 25, or the aircraft fuel tank 75, or both.

In one example, the fluid coolant used by the thermal management system 60 incorporates a phase change material (PCM). PCMs melt and solidify (i.e. change state) at a certain temperature, and are capable of storing thermal energy as the PCM transforms from a solid to a liquid state, and releasing energy as the PCM transforms from a liquid to a solid state. PCMs store latent heat, i.e. thermal energy released or absorbed during a constant-temperature process, e.g. such as a first-order phase transition. Examples of such PCMs include ice/water (which melts/solidifies at 0° C.), wax (e.g. paraffin wax) and salt hydrides (also known as ionic or saline hydrides). Waxes can be formulated with a range of melting points (approximately between −10° C. and +90° C.).

The present invention may in one arrangement provide a fully self-contained solution for mounting an electrical device on the external surface of an aircraft, and more specifically to a fully self-contained system comprising cooling and power/fueling systems. No integration with the aircraft cooling and/or fueling systems is required (although may be used in conjunction with those provided by the detachable pod). An aircraft's power supply is typically limited resource, and a self-powered system such as the one described above minimise additional loading upon the aircraft systems.

There is no retro-fitting required, and the electrical device 50 can be mounted in a "plug and play" manner on the aircraft 10. This reduces or eliminates the need for costly, complicated and/or time-consuming aircraft integration works to be carried out.

Although the invention has been described above with reference to one or more preferred examples, it will be appreciated that various changes or modifications may be made without departing from the scope of the invention as defined in the appended claims. Furthermore, whilst the examples within this description refer to electrical devices, it is explicitly acknowledged that the present thermal management system can be employed for a number of other uses, for example cooling high-energy mechanical heat sources, i.e. internal combustion engines. The examples described above may be combined in any order any maintain the technical benefits of the present invention.

The invention claimed is:

1. A pod for a vehicle, vessel or craft, the pod comprising:
an electrical device;
a thermal management system for the electrical device, the thermal management system comprising a heat-activated release hydrogen storage tank and a fluid coolant system having a carrier fluid and encapsulated phase change material (PCM) particles suspended in the carrier fluid;
a porous membrane in the thermal management system, the porous membrane configured to permit flow therethrough of the carrier fluid and to constrain the encapsulated PCM particles; and
an auxiliary power unit (APU), fueled, at least in part, by hydrogen released from the heat-activated release hydrogen storage tank.

2. The pod according to claim 1, wherein the thermal management system further comprises a fluid coolant system, wherein said APU provides power to both the electrical device and the thermal management system.

3. The pod according to claim 1, comprising a liquid fuel tank, wherein the APU is further fueled by a liquid fuel from the liquid fuel tank.

4. The pod according to claim 1, wherein the heat-activated release hydrogen storage tank is a metal hydride system.

5. The pod according to claim 4, wherein the metal hydride system is an AB, AB2 or AB5 type.

6. The pod according to claim 1, wherein the APU provides a pressurized air supply to at least one of:
the electrical device;
the thermal management system; and
the APU.

7. The pod according to claim 1, wherein the APU comprises:
a generator to provide electrical power to the electrical device; and
a gearbox to provide mechanical power to the thermal management system to pump fluid coolant to the electrical device.

8. The pod according to claim 1, wherein the APU is a gas turbine generator, ram air turbine or a hydrogen fuel cell.

9. The pod according to claim 1, wherein the electrical device is a laser directed energy weapon (DEW).

10. The pod according to claim 1, comprising a liquid fuel feed to receive fuel from a fuel reservoir of the vehicle, vessel or craft.

11. The pod according to claim 1, wherein the pod is configured to receive control signals from the vehicle, vessel or craft, to allow control of the electrical device.

12. The pod according to claim 1, wherein the pod is detachably affixed to pylons on an aircraft wing.

13. The pod according to claim 1, wherein the APU provides a pressurized air supply to at least one of:
the electrical device;
the thermal management system; and
an APU liquid fuel supply.

14. The pod according to claim 1, wherein the pod is detachably affixable to pylons on an aircraft wing.

15. A detachable pod for a vehicle, vessel or craft, the pod comprising:
a liquid fuel tank or feed, to receive liquid fuel;
an electrical device;
a thermal management system for the electrical device, the thermal management system comprising a metal hydride system that includes a heat-activated release hydrogen storage tank and a fluid coolant system with a carrier fluid and encapsulated phase change material (PCM) particles suspended in the carrier fluid;
a porous membrane in the thermal management system, the porous membrane configured to permit flow therethrough of the carrier fluid and to constrain the encapsulated PCM particles; and
an auxiliary power unit (APU), fueled, at least in part, by hydrogen released from the heat-activated release hydrogen storage tank, wherein the APU is further fueled by a liquid fuel from the liquid fuel tank or feed, and wherein the said APU provides power to the electrical device and the thermal management system.

16. The pod according to claim 15, wherein the electrical device is a laser directed energy weapon (DEW).

* * * * *